US007579427B2

(12) United States Patent
Gao et al.

(10) Patent No.: US 7,579,427 B2
(45) Date of Patent: Aug. 25, 2009

(54) SYNTHESIS OF POLY(ARYLENE)S COPOLYMERS CONTAINING PENDANT SULFONIC ACID GROUPS BONDED TO NAPHTHALENE AS PROTON EXCHANGE MEMBRANE MATERIALS

(75) Inventors: Yan Gao, Montréal (CA); Michael D. Guiver, Ottawa (CA); Gilles P. Robertson, Hull (CA)

(73) Assignee: National Research Council of Canada, Ottawa, Ontaro (CA)

( * ) Notice: Subject to any disclaimer, the term of this patent is extended or adjusted under 35 U.S.C. 154(b) by 283 days.

(21) Appl. No.: 11/168,379

(22) Filed: Jun. 29, 2005

(65) Prior Publication Data

US 2006/0004177 A1    Jan. 5, 2006

Related U.S. Application Data

(60) Provisional application No. 60/583,791, filed on Jun. 30, 2004.

(51) Int. Cl.
*C08G 14/04* (2006.01)
*C08G 61/02* (2006.01)
(52) U.S. Cl. .................................... 528/150; 528/86
(58) Field of Classification Search ................ 536/18.2; 528/86, 150
See application file for complete search history.

(56) References Cited

U.S. PATENT DOCUMENTS

| | | | | |
|---|---|---|---|---|
| 3,441,538 A | * | 4/1969 | Marks | 528/86 |
| 3,491,060 A | * | 1/1970 | Gobel et al. | 528/126 |
| 3,810,870 A | * | 5/1974 | Feasey | 528/86 |
| 4,765,973 A | * | 8/1988 | Heller | 424/486 |
| 5,137,988 A | * | 8/1992 | Matzner et al. | 525/471 |
| 5,254,633 A | * | 10/1993 | Han et al. | 525/327.4 |

(Continued)

FOREIGN PATENT DOCUMENTS

| | | |
|---|---|---|
| CA | 2511112 | 6/2005 |
| WO | WO03028140 A2 * | 3/2003 |

OTHER PUBLICATIONS

Naphthalene, Hawley's Condensed Chemical Dictionary, John Wiley and Sons, Inc, 14th Edition http://www.knovel.com/knovel2/HTML_Viewer_Main.jsp?BookID=704&SetID=5311004&TextID=0&Type=null&CurrentPage=0&1sSearch=true&FromSearch=true.*

*Primary Examiner*—Mark Eashoo
*Assistant Examiner*—Liam J Heincer
(74) *Attorney, Agent, or Firm*—J. Wayne Anderson

(57) ABSTRACT

A new series of wholly aromatic poly(arylene ether ether ketone ketone)s containing pendant sulfonic acid groups (SPAEEKK) were conveniently prepared by potassium carbonate mediated nucleophilic polycondensation reactions of inexpensive commercially available monomers: 1,3-bis(4-fluorobenzoyl)benzene (BFBB), sodium 6,7-dihydroxy-2-naphthalenesulfonate (DHNS), and 4,4'-biphenol or hydroquinone in N-methyl-2-pyrrolidone (NMP) at 170° C. FT-IR and NMR were used to characterize the structures and the sulfonate or sulfonic acid contents (SC) of the polymers. Flexible membrane films were obtained by casting N,N-dimethylacetamide (DMAc) solutions of copolymers. Membrane films in acid form were then obtained by treating the sodium form membrane films in 2 N sulfuric acid at room temperature. Glass transition temperatures ($T_g$s) and decomposition temperatures ($T_d$s) of SPAEEKKs in both sodium and acid forms were determined. Water uptake and swelling ratio values increased with SCs and temperatures. The proton conductivities of acid form membrane films increased with SC value and temperature and reached $5.6 \times 10^{-2}$ S/cm at 100° C. for SPAEEKK-100.

17 Claims, 5 Drawing Sheets

U.S. PATENT DOCUMENTS

| | | | | |
|---|---|---|---|---|
| 5,286,809 | A * | 2/1994 | Heinz et al. | 525/420 |
| 5,500,668 | A * | 3/1996 | Malhotra et al. | 347/105 |
| 5,741,408 | A * | 4/1998 | Helmer-Metzmann et al. | 204/252 |
| 5,837,783 | A * | 11/1998 | Arnold et al. | 525/471 |
| 5,916,933 | A * | 6/1999 | Johnson et al. | 523/208 |
| 5,986,045 | A * | 11/1999 | Lau et al. | 528/401 |
| 6,150,491 | A * | 11/2000 | Akkara | 528/86 |
| 6,512,076 | B2 * | 1/2003 | Lee et al. | 528/171 |
| 6,716,955 | B2 * | 4/2004 | Burgoyne, Jr. | 528/86 |
| 6,828,407 | B2 * | 12/2004 | Sasaki et al. | 528/86 |
| 6,828,414 | B2 * | 12/2004 | Okamoto et al. | 528/425 |
| 6,846,899 | B2 * | 1/2005 | Lim et al. | 528/86 |
| 6,903,114 | B2 * | 6/2005 | Backstrom et al. | 514/307 |
| 6,962,965 | B2 * | 11/2005 | Yeager | 528/205 |
| 7,022,823 | B2 * | 4/2006 | Nomura et al. | 534/560 |
| 7,038,004 | B2 * | 5/2006 | Chen et al. | 528/86 |
| 7,087,701 | B2 * | 8/2006 | Londergan | 528/86 |
| 7,115,699 | B2 * | 10/2006 | Yamakawa et al. | 528/172 |
| 7,125,953 | B2 * | 10/2006 | Lockley et al. | 528/480 |
| 2002/0122980 | A1 * | 9/2002 | Fleischer et al. | 429/213 |
| 2003/0044669 | A1 * | 3/2003 | Hidaka et al. | 429/33 |
| 2003/0229196 | A1 * | 12/2003 | Braat et al. | 528/86 |
| 2003/0233933 | A1 * | 12/2003 | Ding et al. | 95/43 |
| 2004/0002576 | A1 * | 1/2004 | Oguma et al. | 528/4 |
| 2004/0044166 | A1 * | 3/2004 | Rozhanskii et al. | 528/86 |
| 2004/0062966 | A1 * | 4/2004 | Goedel et al. | 429/30 |
| 2004/0186262 | A1 * | 9/2004 | Maier et al. | 528/86 |
| 2004/0261198 | A1 * | 12/2004 | Kainz et al. | 8/405 |
| 2005/0075472 | A1 * | 4/2005 | Yeager et al. | 528/86 |
| 2005/0137378 | A1 * | 6/2005 | Hedges | 528/86 |
| 2006/0106190 | A1 * | 5/2006 | Balland-Longeau et al. | 528/86 |
| 2006/0166048 | A1 * | 7/2006 | Sakaguchi et al. | 429/12 |
| 2006/0252906 | A1 * | 11/2006 | Godschalx et al. | 528/86 |
| 2006/0258836 | A1 * | 11/2006 | McGrath et al. | 528/373 |

* cited by examiner

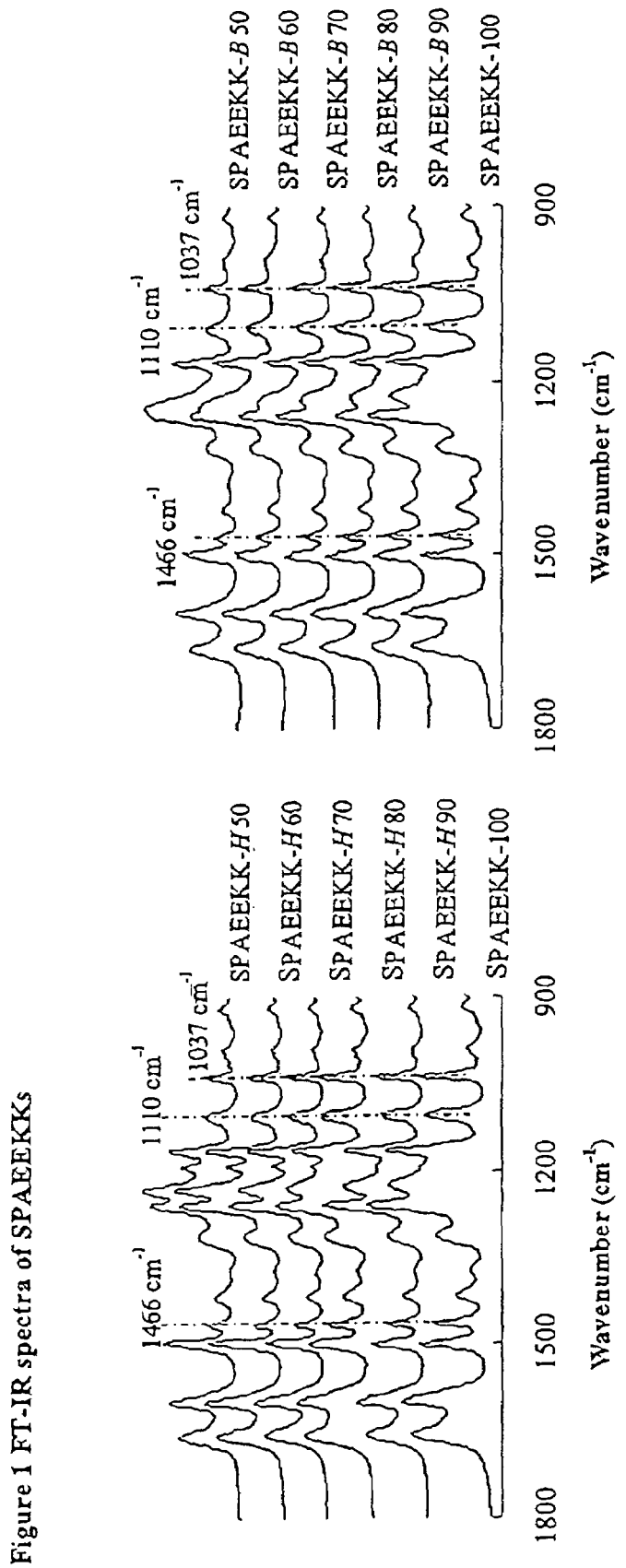
Figure 1 FT-IR spectra of SPAEEKKs

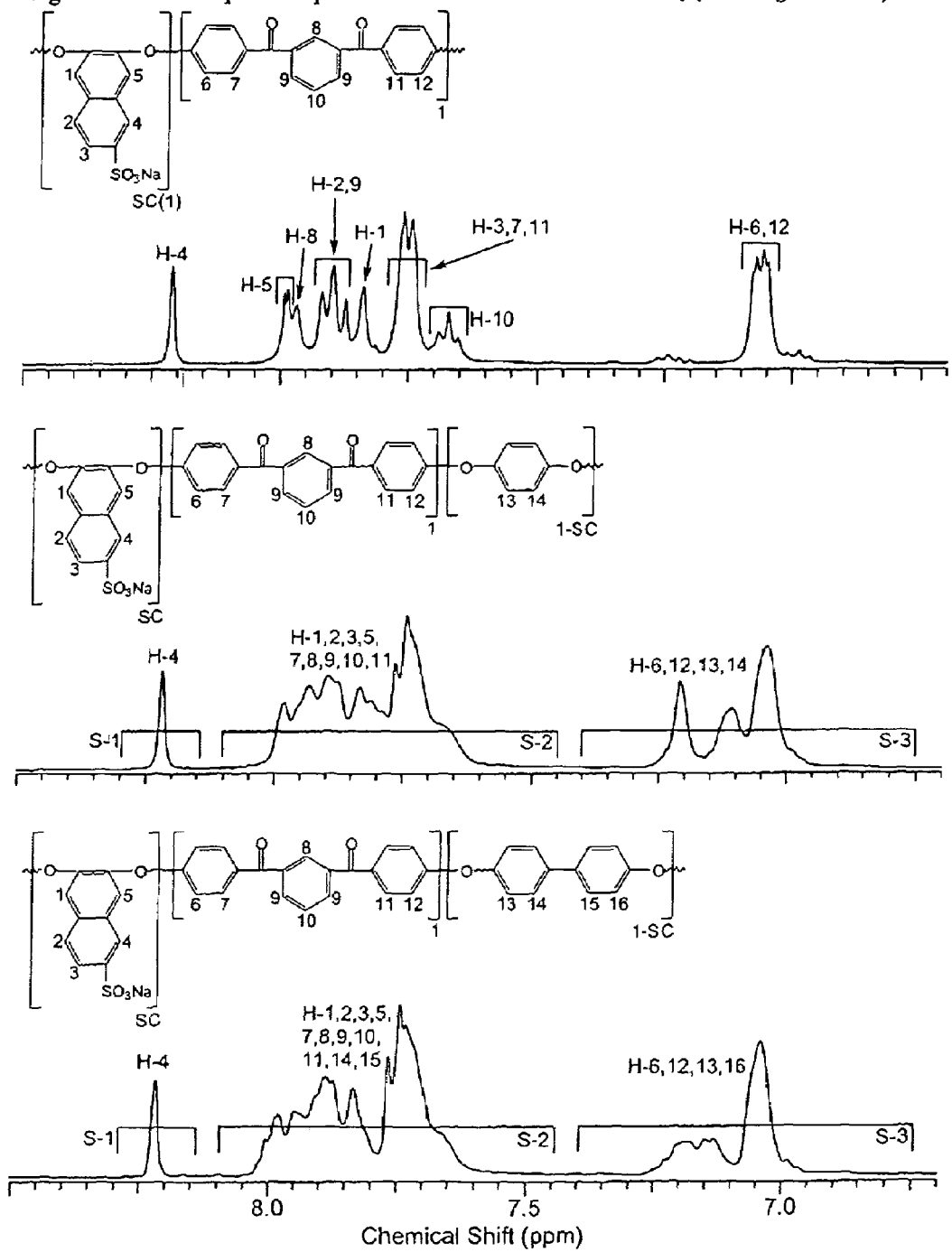
Figure 2 H NMR partial spectra of SPAEEKKs in DMSO-d$_6$ (i = integral value)

Figure 3 TGA traces of SPAEEKKs
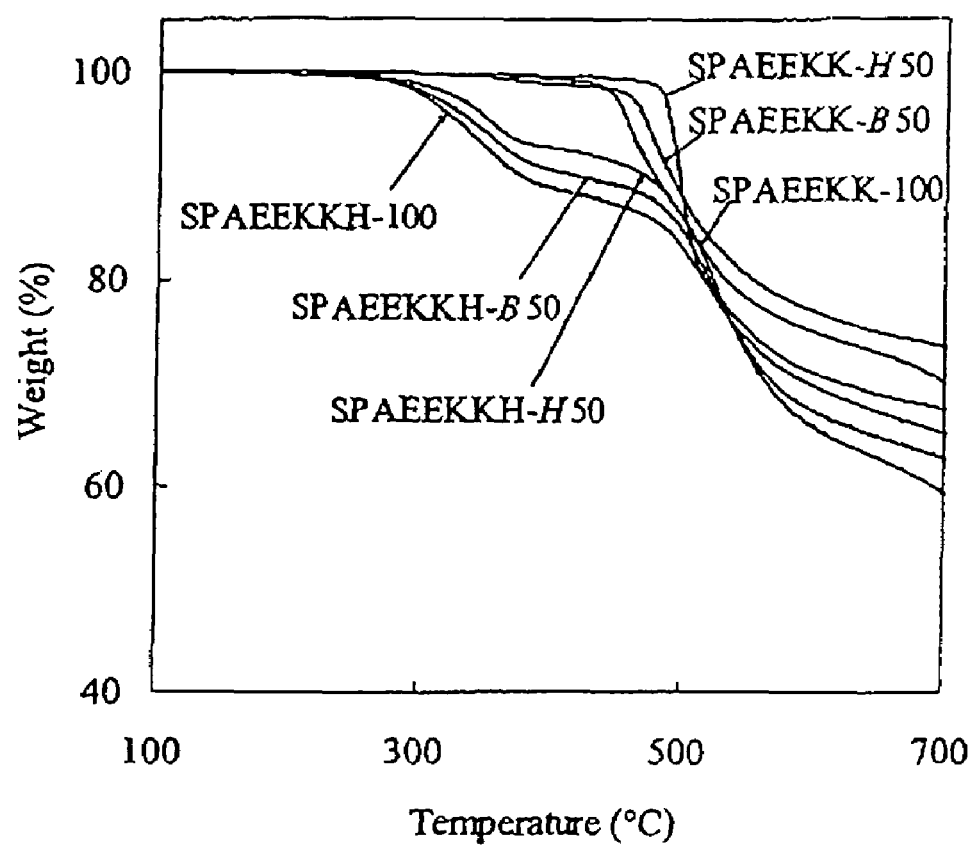

Figure 4 Proton Conductivities of SPAEEKK-Bs
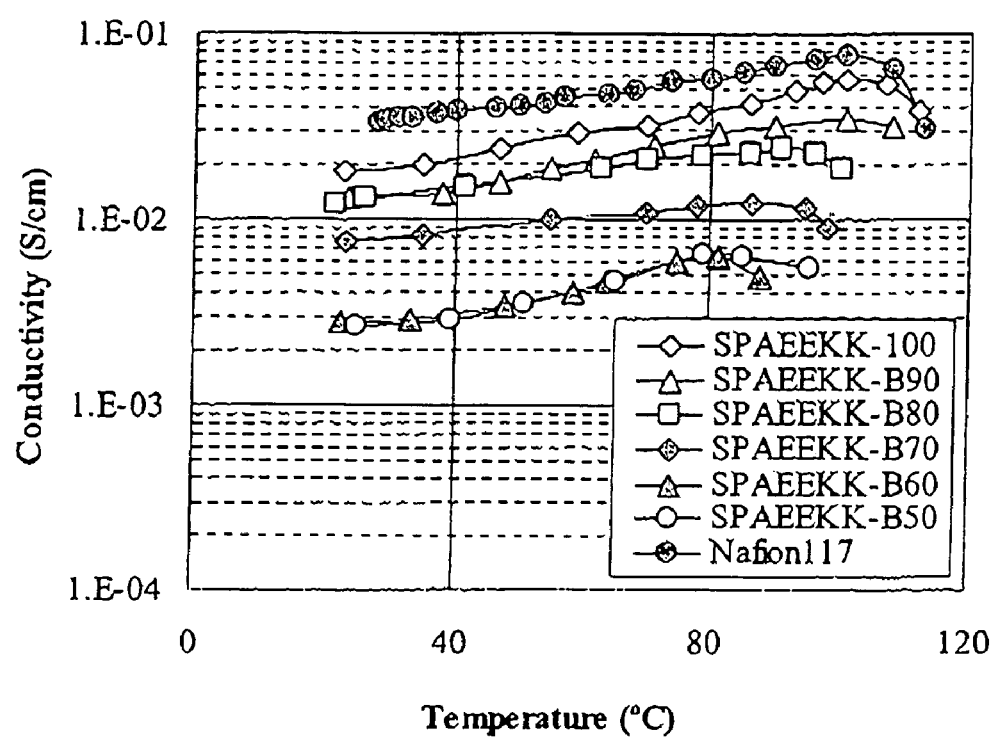

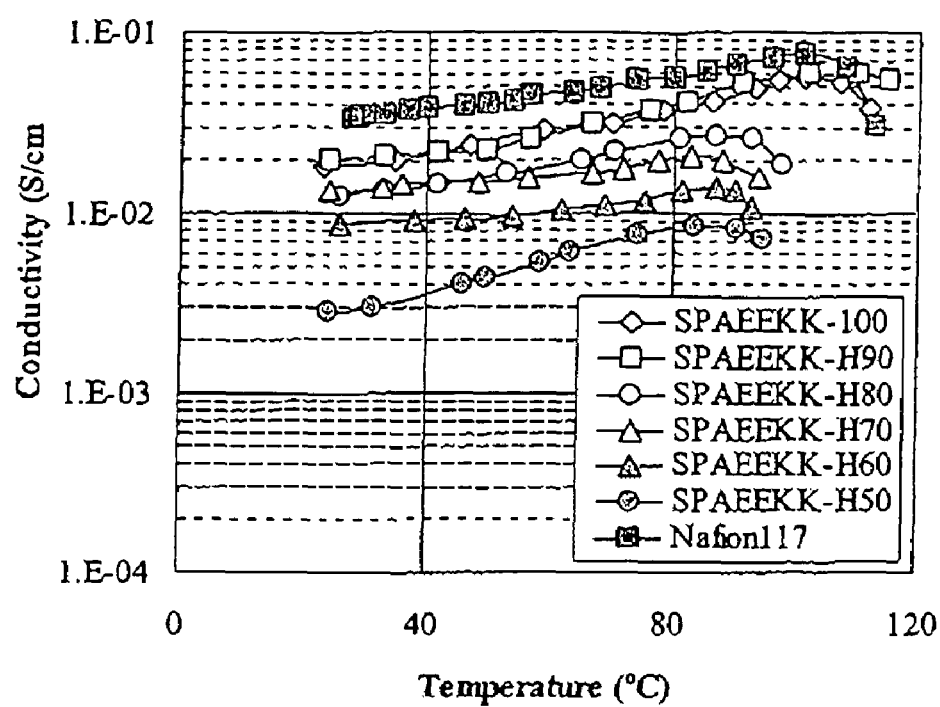
Figure 5 Proton Conductivities of SPAEEKK-*H*s

SYNTHESIS OF POLY(ARYLENE)S COPOLYMERS CONTAINING PENDANT SULFONIC ACID GROUPS BONDED TO NAPHTHALENE AS PROTON EXCHANGE MEMBRANE MATERIALS

CROSS-REFERENCE APPLICATIONS

This application claims the benefit of U.S. Provisional Application Ser. No. 60/583,791 filed Jun. 30, 2004, which is herein incorporated by reference.

BACKGROUND OF THE INVENTION

Proton exchange membrane fuel cells (PEMFC)s are promising clean power sources for vehicular transportation, residential and institutional, and also for computers and mobile communication equipment[1]. As one of the key components of the membrane electrode assembly (MEA), proton exchange membranes (PEM)s carry catalyst, provide ionic pathways for protons and prevent crossover of gases or fuel. Perfluorosulfonic acid PEMs, such as Dupont's Nafion® membrane, are typically used as the polymer electrolytes in PEMFCs because of their excellent chemical and mechanical stabilities as well as high proton conductivity. However, their disadvantages of high cost, low operation temperatures and high fuel permeability are stimulating an intensive search for alternative materials.

Amongst recently developed polymer electrolyte membranes, sulfonated poly(arylene ether ketone)s (SPAEK)s and sulfonated poly(arylene ether sulfone)s (SPAES)s are promising[2-21]. For example, the conductivity of sulfonated Victrex™ PEEK with a SC of 0.65 reaches 0.04 S/cm$^{-1}$ at 100° C./100% RH. In 2002, Wang and McGrath[9] reported the synthesis of biphenyl-based sulfonated poly(arylene ether sulfone)s by direct polymerization reactions of disodium 3,3'-disulfonate-4,4'-dichlorodiphenylsulfone (SDCDPS), 4,4'-dichlorodiphenylsulfone and 4,4'-biphenol. The conductivity values at 30° C. for the 40% SDCDPS copolymer and the 60% SDCDPS copolymer were 0.11 S/cm and 0.17 S/cm respectively. In addition, compared with post-sulfonation reactions, this method allows close control the sulfonate content of polymers and avoids possible crosslinking or other side reactions that could occur under modification conditions. Our group and Xiao et al also reported the preparation and conductivity results of sulfonated poly(phthalazinone ether ketone)s and sulfonated poly(phthalazinone ether sulfone)s by both sulfonation reactions and direct polymerization reactions[12-16]. Both methods gave sulfonated polymers with conductivities higher than 10$^{-2}$ S/cm at around SC 1.0.

In sulfonated polymer membrane films, the hydrophobic backbone and the hydrophilic sulfonic acid groups nanophase separate into two domains in the presence of water. The hydrophobic domain provides the polymers with morphological stability and the hydrophilic domain is responsible for transporting protons and water[19, 20]. Compared with perfluorinated sulfonic acid membranes, sulfonated poly(aryl ether ketone)s are reported[20] to have a smaller characteristic separation length and wider distribution with more dead-end channels and a larger internal interface between the hydrophobic and hydrophilic domains as measured by small angle X-ray scattering (SAXS)[20]. However, if short pendant side chains between the polymer main chain and the sulfonic acid groups exist in the polymer structure, the nano-phase separation of hydrophilic and hydrophobic domains may be improved and the amount of dead-end pockets decrease[7, 22]. Rikukawa and his coworkers[7] prepared sulfonated PEEK (SPEEK) and sulfonated poly(4-phenoxybenzoyl-1,4-phenylene, Poly-X 2000) (SPPBP) by post-sulfonation reactions of corresponding parent polymers. They found that SPPBP, which has pendant side chains between polymer main chain and sulfonic acid groups, showed higher and more stable proton conductivity than SPEEK. Jannasch and co-workers devised a new route[22] to increase the distance of sulfonic acid groups from the polysulfone main chain via lithiation of polysulfone[23] followed by anionic reaction with sulfobenzoic acid cyclic anhydride. Miyatake and Hay[24] synthesized copolymers containing sulfonated tetraphenylene and fluorinated alkane moieties with sulfonic acid groups attached onto pendant phenyl groups by the post-sulfonation reaction of corresponding polymers.

Sodium 6,7-dihydroxy-2-naphthalenesulfonate (DHNS) is a commercially available and inexpensive naphthalenic diol containing a sulfonic acid side group, which is widely used in dye chemistries.

SUMMARY OF THE INVENTION

According to one aspect of the present invention, a series of poly(arylene ether ether ketone ketone) copolymers containing sulfonic acid groups (SPAEEKK) of structural formula I is provided, comprising

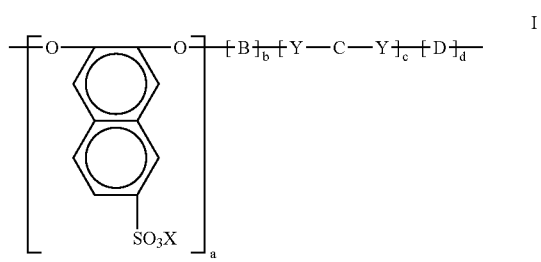

wherein X is H or a cation e.g. an alkali metal counterion such as Li$^+$, Na$^+$, K$^+$, Rb$^+$ or Cs$^+$, or an ammonium salt, Y is sulfur or oxygen, B and D are independently selected from:

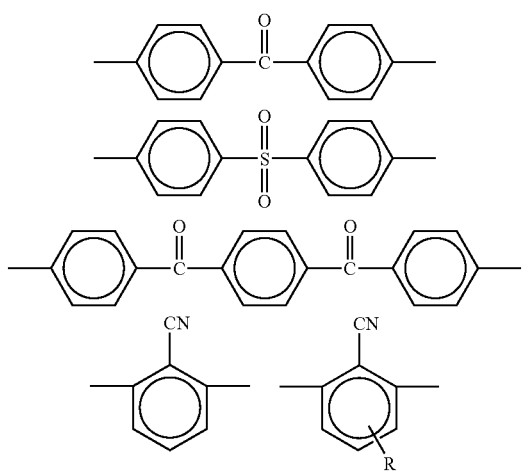

-continued

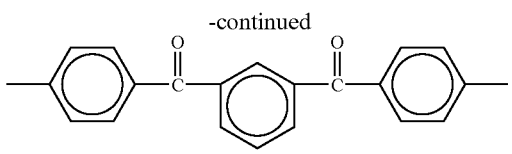

wherein R is one or more substituent(s) e.g. chlorine, bromine, alkyl, aromatic or functional groups that could be employed for cross-linking the polymer, C is derived from either a bisphenol or bisthiol and is used to control the sulfonate content in the copolymer and is selected from:

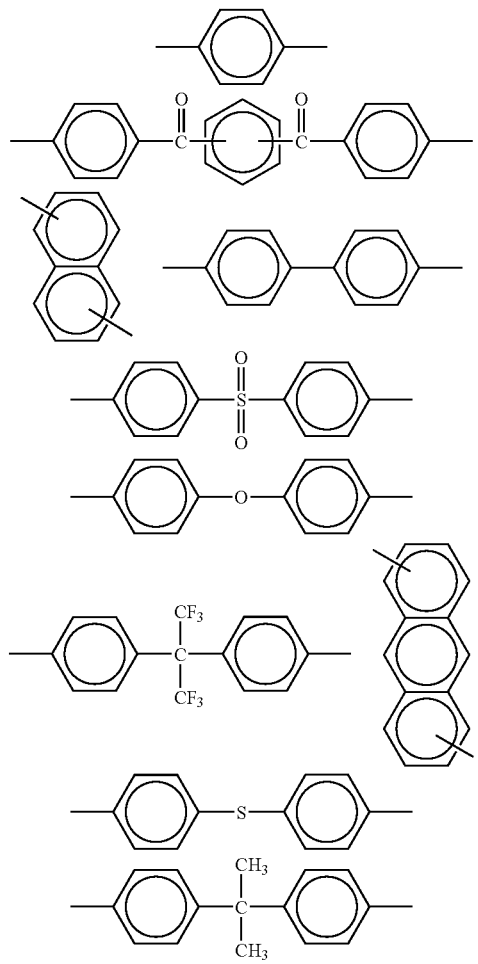

a,b,c,d represent mol fractions of the monomer present in the copolymer where each are independently from 0.1 to 1, and (a+c)=(b+d).

According to another aspect of the invention, a process is provided for making the novel SPAEEKK co-polymers of structural formula I, comprising nucleophilic polycondensation of commercially available diol monomers, see scheme 1.

Accordingly, the process comprises reacting at elevated temperature in the presence of $K_2CO_3$, a compound resulting from polycondensation in the residue of a monomer selected from the group consisting of:

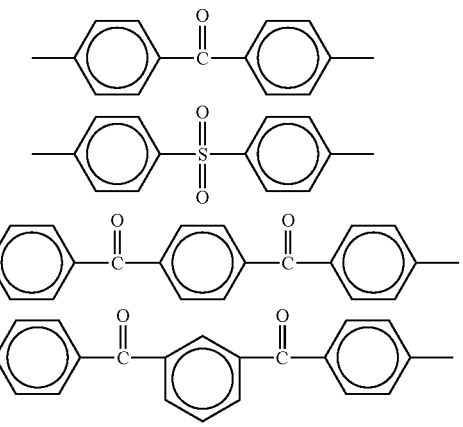

wherein, R is one or more substituent(s) on the aromatic nitrile, such as fluorine, alkyl, aromatic or functional groups that could be employed for crosslinking the polymer, a sulfonted naphthalene diphenol monomer of structural formula II

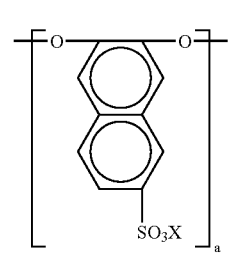

II wherein X is H or a cation, e.g. an alkali metal counterion such as $Li^+$, $Na^+$, $K^+$, $Rb^+$ or $Cs^+$, or an ammonium salt, and a monomer of structural formula III

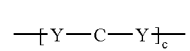

III wherein Y is sulphur or oxygen, and

C is derived from either a bisphenol or bisthiol and is used to control the sulfonate content in the copolymer and is selected from:

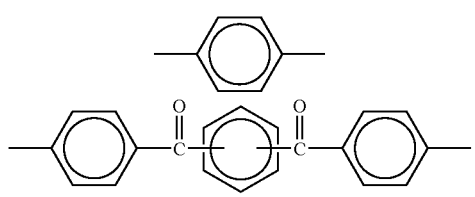

-continued

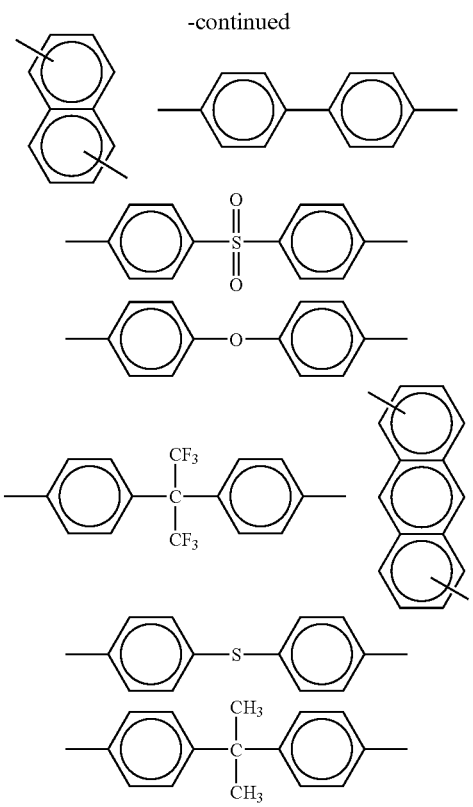

a,b,c,d represent mol fractions of the monomer present in the copolymer where each are independently from 0.1 to 1, and (a+c)=(b+d).

Some specific examples of B and D are pentafluorobenzonitrile having 3 F atoms at the 3,4,5-position. Another would be 3,5,-F, 4-bromo. Another would be 3,5-F, 4-H. Also simple, 3,4,5-H. As for crosslinking groups derivatives of 2,6-F benzonitrile, including an allyl or vinyl group.

In a preferred embodiment of the process, the reaction is effected under inert gas atmosphere in the presence of an aprotic polar solvent, such as NMP, and a dehydrating agent typically used in this kind of a reaction, known as "nucleophilic aromatic substitution polycondensation". Toluene and other similar types of compounds could be used such as xylene. The main thing is that the boiling point is >100C, it is not miscible to a great extent with water, and it is miscible with the polar aprotic solvent, and would not reduce the polymer and reactant solubility too much.

In one embodiment, 1,3-bis(4-fluorobenzoyl)benzene (BFBB), sodium 6,7-dihydroxy-2-naphthalenesulfonate (DHNS) and 4,4'-Biphenol or hydroquinone were co-polymerized.

In an embodiment of the process aspect of the invention, the content of sulfonic acid groups in the copolymers was controlled by varying the ratio of the sulfonated diol monomer II to either biphenol or hydroquinone diol monomer III.

The properties of new SPAEEKKs were measured.

BRIEF DESCRIPTION OF THE DRAWING

FIG. 1 FT-IR spectra of SPAEEKKs
FIG. 2 $^1H$ NMR partial spectra of SPAEEKKs in DMSO-$d_6$ (i=integral value)
FIG. 3 TGA traces of SPAEEKKs
FIG. 4 Proton Conductivities of SPAEEKK-Bs
FIG. 5 Proton Conductivities of SPAEEKK-Hs

DETAILED DESCRIPTION OF THE INVENTION

2. Experimental Part 2.1. Materials

DHNS was purchased from Rintech, Inc. and recrystallized from a mixture of ethanol/water (50/50) before use. NMP was purchased from Aldrich Co. Inc. and vacuum distilled before use. All other chemicals were reagent grade and were purchased from Aldrich Co. Inc. and used as received.

2.2. Copolymerization

As an example of a typical reaction, 5 mmol BFBB, 3 mmol DHNS, 2 mmol 4,4'-biphenol, and 7.5 mmol $K_2CO_3$, were added into a three-neck flask equipped with a magnetic stirrer, a Dean-Stark trap, and an argon gas inlet, then 10 mL NMP and 10 mL toluene were charged into the reaction flask under an argon atmosphere. The reaction mixture was heated to 130 to 140° C. After dehydration and removal of toluene, the reaction temperature was increased to about 160 to 170° C. When the solution viscosity had increased obviously, the mixture was cooled to 100° C. and coagulated into a large excess of ethanol with vigorous stirring. SPAEEK-B60 resulted, where B refers to the comonomer being 4,4'-biphenol; in another example instead, H refers to the comonomer being hydroquinone see scheme 1; n (60) refers to the DHNS percentage content of aromatic phenol monomers. After washing with ethanol twice, SPAEEKKs were purified by dialysis for a week to remove salt, using MEMBRA-CEL™dialysis tubing (MWCO 3500) obtained from Serva Electrophoresis (Germany).

2.3. Copolymer Analysis and Measurement 1D and 2D NMR spectra were obtained on a Varian Unity Inova NMR spectrometer operating at a proton frequency of 399.95 MHz and a carbon frequency of 100.575 MHz using a 5 mm indirect detection probe. Deuterated dimethylsulfoxide (DMSO-$d_6$) was the NMR solvent and the DMSO signal at 2.50 ppm was used as the chemical shift reference. IR spectra were measured on a Nicolet 520 Fourier transform spectrometer with membrane film samples in a diamond cell.

A TA Instruments thermogravimetric analyser (TGA) instrument model 2950 was used for measuring decomposition temperatures ($T_d$)s. Polymer samples for TGA analysis were preheated to 150° C. at 10° C./min under nitrogen atmosphere and held isothermally for 60 min for moisture removal. Samples were then heated from 90° C. to 750° C. at 10° C./min for $T_d$ measurement. A TA Instruments differential scanning calorimeter (DSC) model 2920 calibrated with Tin at 231.93° C. was used for measuring $T_g$s.

Intrinsic viscosities were determined using an Ubbelohde viscometer for N,N-dimethylacetamide (DMAc) solutions of copolymer at 30° C.

2.4. Preparation of Membrane Films

An amount of 0.6 g copolymer in the sodium salt form was dissolved in 20 mL of DMAc and filtered. The filtered solution was poured onto a glass plate and dried at about 40° C. for about one day. The acid form (SPAEEKKH-B or SPAEEKKH-H) membrane films were obtained by immersing corresponding sodium form SPAEEKK-B or SPAEEKK-H membrane films in 2 N $H_2SO_4$ for 24 h at room temperature, followed by deionized water for 24 h during which time the water was changed several times.

2.5. Water Uptake Content Measurement and Swelling Ratio

The sample films were soaked in deionized water for 24 h at determined temperatures. The membrane films were then dried at 80° C. for 24 h. Weights of dry and wet membranes were measured. The water uptake content was calculated by $$\text{Uptake content (\%)} = \frac{\omega_{wet} - \omega_{dry}}{\omega_{dry}} \times 100\%$$

Where $\omega_{dry}$ and $\omega_{wet}$ are the masses of dried and wet samples respectively. The swelling ratio was calculated from films 5~10 cm long by:

$$\text{Swelling ratio (\%)} = \frac{l_{wet} - l_{dry}}{l_{dry}} \times 100\%$$

Where $l_{dry}$ and $l_{wet}$ are the lengths of dry and wet samples respectively.

2.6. Proton Conductivity

The proton conductivity measurements were performed on SPAEEKKH-B or SPAEEKKH-H membrane films by AC impedance spectroscopy over a frequency range of $1\text{-}10^7$ Hz with oscillating voltage 50-500 mV, using a system based on a Solatron 1260 gain phase analyzer. A 20×10 mm membrane sample was placed in an open, temperature controlled cell at ambient atmospheric pressure, where it was clamped between two blocking stainless steel electrodes with a permanent pressure of ~3 kg/cm$^2$. Specimens were soaked in deionized water for 24 to 48 h prior to the test. The cell was open to air, and humidity from boiling water was constantly supplied to the area around the cell. The conductivity ($\sigma$) of the samples in the transverse direction (across the membranes) was calculated from the impedance data, using the relation $\sigma = d/RS$ where d and S are the thickness and face area of the sample respectively and R was derived from the low intersect of the high frequency semi-circle on a complex impedance plane with the Re (Z) axis.

3. Results and Discussion 3.1. Synthesis and Characterization of SPAEEKKs

All monomers selected in this study for the preparation of SPAEEKKs are commercially available and inexpensive. The functional monomer, DHNS is a diphenol with pendant sodium sulfonate groups and is widely used in dye chemistries. BFBB is industrially used in the preparation of poly (ether ether ketone ketone) (PEEKK). Since DHNS is expected to have a tendency for oligomer cyclization, monomers with a more linear structure, 4,4'-biphenol and hydroquinone, were selected for copolymerizations. The SPAEEKK copolymers were obtained by K$_2$CO$_3$ mediated nucleophilic polycondensation[2-4]. As shown in Scheme 1, DHNS, BFBB and the third monomer, 4,4'-biphenol or hydroquinone diols were polymerized in NMP and toluene was used to remove the water from starting materials and formed during the reactions. Since the copolymers were prepared by reacting one mole of diols (DHNS) and either 4,4'-biphenol (B) or hydroquinone (H)) with one mole of BFBB, the SC is expressed as the ratio of DHNS units (bearing the —SO$_3$Na group) to 1.0 BFBB unit. Hence, the SC is defined as the number of sulfonic acid salt groups per average repeat unit of copolymer. For example, the average repeat unit of SPAEEKK-H SC 0.7 is composed of 0.7 units of DHNS, 0.3 unit of hydroquinone (H) and 1.0 unit of BFBB. Expressed in this way, both the number of —SO$_3$Na groups per polymer repeat unit and the ratio of diol monomers (SC:1-SC) can be conveniently derived. SPAEEKKs with different SC values were obtained by adjusting the feed ratio of sulfonated monomer diol DHNS to unsulfonated monomer diols 4,4'-biphenol or hydroquinone. In order to obtain proton conductivities in a useful range, only SPAEEKKSs with relatively high SCs were prepared. The polymerization reactions were conducted at 130 to 140° C., initially to effect dehydration; the reaction temperatures were then raised to 160-170° C. to effect the polymerizations, until no obvious further increase in viscosities was observed. All polymerization reactions proceeded smoothly, homogenously and quantitatively to give SPAEEKKs. Polymerization conditions and details of the resulting polymers are summarized in Table 1. Intrinsic viscosity values of SPAEEKKs in DMAc at 30° C. were all higher than 1.0, which indicated the success of polymerization in producing high polymers. All the polymer series were cast into strong transparent and flexible membrane films, which also indicated the high molecular weight of the polymers. Although the o-diphenol DHNS was expected to have a high cyclization tendency, polymerization dominated over the cyclization process in these reactions where BFBB was employed. It is of interest to note here that when 4,4'-difluorobenzophenone and 4-fluorophenylsulfone were used instead of BFBB, only brittle polymers could be obtained. Compared with post-sulfonation reaction or other modification reactions, the copolymerization method could avoid side reactions of cross-linking or degradation and the sulfonation content was readily controlled through the monomer feed ratio. Unlike Nafion, SPAEEKKs were readily prepared from relatively inexpensive starting materials. All the obtained SPAEEKKs had good solubility in aprotic solvents such as NMP, DMAc, N,N-dimethylformamide (DMF) and dimethylsulfoxide (DMSO).

The SPAEEKK copolymers are expected to be more thermohydrolytically stable compared with sulfonated poly(aryl ether ketone)s obtained by regular post-sulfonation reactions and direct polymerizations of sulfonated difluorobenzophenone with biphenols. In many other sulfonated polymers, whether the sulfonic acids groups were introduced by post-sulfonation or by direct polymerization, the sulfonic acid groups are normally located on the ortho position to the ether linkage. The electron withdrawing sulfonic acid groups on ortho positions are expected to increase the ease of hydrolysis of ether linkage and decrease the stability[24]. In the present SPAEEKKs, sulfonic acid groups are attached on a pendant benzene ring away from the ether linkage, which is expected to decrease the effect on the hydrolysis of ether linkages.

Sulfonic acids or sulfonates are considered to be leaving groups that have the possibility of dissociating from their parent structure during high temperature reactions, which was observed in the study of other research groups[25]. FT-IR is a convenient method to analyze the structures of polymers containing sulfonic or sulfonate groups. In order to verify if part or all of the sulfonate groups were lost during the polymerization reactions, FT-IR was used in this work. FT-IR of SPAEEKKs confirmed the introduction of sodium sulfonate groups into the polymer chains and no decomposition of sodium sulfonate groups was observed during the polymerization reactions. FIG. 1 shows the FT-IR spectra of SPAEEKKs. In the spectra of both series of SPAEEKKs, characteristic bands of the aromatic sodium sulfonate symmetric and asymmetric stretching vibrations were observed at 1037 and 1110 cm$^{-1}$ for all resulting polymers. These two characteristic absorption bands increase with increasing DHNS content. In similarity with our previously synthesized SPPEKs[13], the splitting of characteristic absorption bands of 1,4-aromatic ring substitution at around 1466 to 1500 cm$^{-1}$ caused by the presence of sodium sulfonate groups were also observed. The absorption band at 1466 cm$^{-1}$ decreases with the decreasing DHNS content and the SC values. In addition, a change in the characteristic absorption bands of aromatic ether link at around 1234 to 1259 cm$^{-1}$ was also observed.

Stacked spectra of SPAEEKK-100, SPAEEKK-H and SPAEEKK-B showing an expansion of the aromatic region are displayed in FIG. 2. SPAEEKK-100 (top spectrum) was prepared by polymerization of DHNS and BFBB (1:1) and all of the aromatic hydrogen signals originating from the repeat units (R.U.) were unambiguously assigned using 1D ($^1$H, homonuclear decoupling) and 2D (COSY, HSQC, HMBC) NMR experiments. Although the $^1$H NMR spectra of SPAEEKK-H and SPAEEKK-B appear more complex, assignment of the entire spectrum was also unequivocal, based on the comparison with the fully assigned spectrum of SPAEEKK-100. The chemical shifts of the proton signals from hydroquinone or biphenol is well known and predictable. Therefore, aromatic protons located at the electron rich ortho-ether position of hydroquinone or biphenol will be strongly shielded and will appear at low frequency (6.95-7.30 ppm) while the biphenol proton at the meta-oxygen position will be deshielded by the adjacent phenyl ring and show at higher frequency (7.60-8.05 ppm).

$^1$H NMR was the most convenient method to determine the experimentally obtained SCs from the copolymerization reactions. Having assigned all the NMR signals from the synthetic copolymers, one can use simple mathematical functions and the ratio of spectral line intensities (integral values) to assess the SC. The aromatic region of both polymer derivatives (H and B) was split in three sections (S1, S2 and S3) and their integral values were used in the calculation of the SCs. using the following equations:

$$SPAEEKK\text{-}H \quad \frac{S1}{S3} = \frac{(n)}{(8-4n)} \quad \text{or} \quad \frac{S2}{S3} = \frac{(4n+8)}{(8-4n)}$$

$$SPAEEKK\text{-}B \quad \frac{S1}{S3} = \frac{(n)}{(8-4n)} \quad \text{or} \quad \frac{S2}{S3} = \frac{12}{(8-4n)}$$

where:
S1 (8.15-8.30 ppm)=H$_4$*n=1n
S2 of SPAEEKK-H (7.50-8.10 ppm)=H$_{1,2,3,5}$*n+ H$_{7,8,9,10,11}$=4n+8
S2 of SPAEEKK-B (7.50-8.10 ppm)=H$_{1,2,3,5}$*n+H$_{7,8,9,10,11}$+ H$_{14,15}$*(1−n)=12
S3 of SPAEEKK-H=(6.75-7.40 ppm)=H$_{6,12}$+ H$_{13,14}$*(1−n)=8−4n
S3 of SPAEEKK-B=(6.75-7.40 ppm)=H$_{6,12}$+ H$_{13,16}$*(1−n)=8−4n
n=number of DHNS groups=SC(sulfonation content)

For example: the spectrum of SPAEEKK-H70 (FIG. 2 middle) shows integration values of 1.00 (S1), 15.68 (S2) and 7.91 (S3). Inserting these values in the above equations for SPAEEKK-H results into SCs (n) of 0.67 and 0.68. Similarly, SPAEEKK-B80 (FIG. 2 bottom) has integration values of 1.00 (S1), 15.21 (S2) and 6.31 (S3) leading to SCs of 0.78 and 0.76. The observed SC values listed in Table 1 were averaged after obtaining SC values from each one of the two equations; the difference between the two methods never exceeded 0.02 for any of the polymers. The observed SC values were in agreement with the expected SC derived from the monomer ratios.

3.2. Thermal Properties of SPAEEKKs

The sodium form membrane films were converted into their corresponding acid forms (SPAEEKKH-H or SPAEEKKH-B) by immersing the films in 2 N H$_2$SO$_4$ for 24 h at room temperature, followed by immersion in deionized water for 24 h to rinse the excess acid, and air drying at room temperature for 24 h.

Thermal stabilities of SPAEEKKs in both sodium and acid forms were investigated by TGA analysis at a heating rate of 10° C. under nitrogen atmosphere, and the results are listed in Table 2. Table 2 shows that T$_{d5\%}$s and onset weight loss temperatures (T$_d$)s of SPAEEKKs in sodium form are observed between 456 to 489° C. and 440 to 483° C. respectively. T$_{d5\%}$s and T$_d$s of SPAEEKKs in acid form are observed between 328 to 353° C. and 292 to 308° C. respectively. The comparison of SPAEEKKs in sodium and acid forms is also displayed in TGA curves (FIG. 3). Referring to our previous studies on SPPEKs[12-14], SPAEEKK-100 displays a similar thermal stability to that of other sulfonated poly(aryl ether ketone)s.

T$_g$s of SPAEEKKs in both sodium and acid forms were also determined. Samples for DSC analysis were initially heated at a rate of 10° C./min under nitrogen atmosphere to well below the polymer T$_d$ point, ramped to 90° C., then heated to temperatures below their T$_d$ points at the same rate. The reported T$_g$s in this article were obtained from the second scan. Results are also listed in Table 2. All SPAEEKKs in sodium form had T$_g$s between 215 to 321° C. and acid form between 180 to 223° C. respectively. Generally speaking, T$_g$s of SPAEEKKs in both sodium and acid forms increase with SC values and the increase in T$_g$ of acid form copolymers is much lower than that of sodium form copolymers. The effect of SC on T$_g$s of SPAEEKKs with higher SCs is smaller than that on T$_g$s of SPAEEKKs with lower SCs. Thus, T$_g$s increase obviously with SC at lower SC values, while the increase becomes less significant at higher SC values. Although T$_g$s of sodium form SPAEEKKs continue to increase, T$_g$s of acid form SPAEEKKs attain a certain value at some SC value, and then maintain or even slightly decrease T$_g$. SPAEEKKs containing hydroquinone show somewhat lower T$_g$s than SPAEEKKs containing 4,4'-biphenol in both sodium and acid forms. However, the differences are not obvious except copolymers with SC 0.5.

3.3. Water Uptake and Swelling Ratio

In order to evaluate the water absorption and dimensional change, the water uptakes and swelling ratios of SPAEEKKs in both the sodium and acid forms were measured at room temperature and at 80° C. The results are listed in Table 3. The acid form SPAEEKKs membrane films have higher water uptake and swelling ratio values than sodium form ones. At room temperature, the water uptake and swelling ratio increased regularly with SC values for all SPAEEKKs. However, at 80° C. the water uptake and swelling ratio increase regularly with SC values for all copolymers and thereafter increase rapidly at SC 1.0 in both sodium and acid forms. The acid form SPEEK with SC 1.0 is mostly dissolved in water after 24 h heating at 80° C., indicating that the additional diols hydroquinone or biphenol were necessary for dimensional stability in a fuel cell application. Copolymers containing hydroquinone show a lesser dimensional swelling behavior at 80° C. than those containing biphenol for the same monomer ratios, even though the sulfonic acid content of the copolymers was greater. The copolymers containing up to 80% DHNS in the diol ratio did not exhibit excessive dimensional change at 80° C., although the SPAEEKK-H90 exhibited far less swelling than the SPAEEKK-B90 copolymer.

3.4 Proton Conductivity

Proton conductivities as a function of temperature are displayed in FIGS. 4 and 5 for SPAEEKK-Bs and SPAEEKK-Hs respectively. For SPAEEKK-Bs, it is obvious that the proton conductivities increase with SC values as they do with the water uptake. SPAEEKK-B80, SPAEEKK-B90 and SPAEEKK-100 show room temperature proton conductivities higher than $10^{-2}$ S/cm, which is the lowest value of practical interest for use as PEMs in fuel cells. Conductivities also increase with temperatures and attain a certain value, then begin to decrease presumably due to dehydration of membrane films in the open cell at elevated temperatures. SPAEEKK-B90 and SPAEEKK-100 showed increased proton conductivities up to $3.4 \times 10^{-2}$ and $5.6 \times 10^{-2}$ S/cm at 100° C. respectively. The temperature points for maximum proton conductivities also increase with SC values. For example, SPAEEKK-B50, SPAEEKK-B80 and SPAEEKK-100 show maximum proton conductivities at about 79° C., 90° C. and 100° C. respectively. The temperature points for maximum proton conductivities of SPAEEKK-Bs with lower SC values are lower than those of SPAEEKK-Bs with higher SC values and might be caused by their lower water uptake. Since SPAEEKK-Bs with low SC values absorb less water than high SC SPAEEKKs, a slight loss of absorbed water at elevated temperatures will result in insufficient proton carriers earlier, and result in earlier decrease in proton conductivities.

SPAEEKK-Hs also showed proton conductivities increasing with temperature and SC values. Generally speaking, SPAEEKK-Hs showed higher proton conductivities than SPAEEKK-Bs at the same SC value since they have lower equivalent molecular weight, which are listed in Table 1. All SPAEEKK-Hs with SCs higher than 0.7 showed room temperature proton conductivities higher than $10^{-2}$ S/cm. SPAEEKK-H90 showed almost the same proton conductivity curve with SPAEEKK-100 and its conductivity increased with temperature and reached $6.0 \times 10^{-2}$ S/cm at 110° C. and then decreased.

Compared with that of Nafion117, the proton conductivities of SPAEEKKs are all lower. Although the conductivities of the present materials do not exceed that of Nafion117, the differences are not great and they are of the same magnitude. The present materials are adequate for practical application in fuel cells and they have other qualities such as ease of preparation from inexpensive starting materials. In addition, as shown in FIGS. 4 and 5, the proton conductivity profiles with temperature for SPAEEKK-100, SPAEEKK-H90 and SPAEEKK-B90 show a similarity to Nafion 117; that is the proton conductivities show less temperature-dependant behavior compared with other post-sulfonated SPAEKs[13]. The less temperature-dependant characteristics of proton conductivity of SPAEEKKs could be the result of an improved separation between hydrophilic and hydrophobic phases as described in Introduction section.

Conclusions

Wholly aromatic poly(arylene ether ether ketone ketone) copolymers containing pendant sulfonic acid groups with different SC values were successfully synthesized via $K_2CO_3$ mediated nucleophilic polycondensation reactions from commercially available monomers 1,3-bis(4-fluorobenzoyl)benzene (BFBB), the sulfonated diol sodium 6,7-dihydroxy-2-naphthalenesulfonate (DHNS) and other diols. The content of sulfonic acid groups in the copolymers was controlled by varying the ratio of the sulfonated diol monomer to either biphenol or hydroquinone diol monomers. When the copolymerization was conducted using either 4,4'-difluorobenzophenone or 4-fluorophenylsulfone instead of BFBB, only brittle polymers were obtained. In comparison with most sulfonated poly(arylene ether ketone)s in which the sulfonic acid groups are situated ortho to ether linkage, thereby rendering the polymers more susceptible to thermohydrolytic instability, the present SPAEEKKs have sulfonic acid groups situated apart from the polymer main chain and ether linkage and are thus anticipated to have superior thermohydrolytic stability. The SPAEEKK series have high intrinsic viscosities and show good solubilities in aprotic solvents, enabling them to be cast into strong flexible films. $T_g$s of both sodium and acid forms SPAEEKKs increase with DS. SPAEEKKs are thermally stable up to 400° C. in sodium form and 300° C. in acid form. Both sodium and acid form sulfonated membrane films show continuous increases in water uptake and swelling ratio with DS and temperature, and the acid form membrane films show higher and more rapid increases than sodium form ones. The polymer comprised solely of BFBB and DHNS was partially soluble in water at 80° C., indicating that the additional diols were necessary for dimensional stability in a fuel cell application. Copolymers containing hydroquinone show a lesser dimensional swelling behavior at 80° C. than those containing biphenol for the same monomer ratios. SPAEEKKs showed proton conductivities higher than $10^{-2}$ S/cm, which is close to that of Nafion, but the cost of the present SPAEEKKs is much lower that that of Nafion. Therefore, the novel SPAEEKK compounds are expected to find application as PEM materials for fuel cells.

REFERENCES

[1] Steele, B. C. H.; Heinzel, A. *Nature* 2001, 414, 345.
[2] Cassidy, P. E. Thermally stable polymers: Syntheses and properties. Marcel Dekker Inc. New York and Basel., 1980.
[3] Cotter, R. J. Engineering Plastics: Handbook of Polyarylethers; Gordon and Breach Science Publishers S.A., Switzerland, 1995.
[4] Wang, S.; McGrath, J. In Synthetic Methods in Step-Growth Polymers; Rogers, M. E.; Long, T. E. (Eds.); Wiley Europe, 2003; Chapter 6.
[5] Yen, S-P. S.; Narayanan, S. R.; Halpert, G.; Graham, E.; Yavrouian, A. U.S. Pat. No. 5,769,496, 1998.
[6] Helmer-Metzmann, F.; Osan, F.; Schneller, A.; Ritter, H.; Ledjeff, K.; Nolte, R.; Thorwirth, R. U.S. Pat. No. 5,438,082, 1995.
[7] Kobayashi, T.; Rikukawa, M.; Sanui, K.; Ogata, N.; *Solid State Ionics* 1998, 106, 219.
[8] Zaidi, S. M. J.; Mikhailenko, S. D.; Robertson, G. P.; Guiver, M. D.; Kaliaguine, S.; *J. Membrane Sci.* 2000, 173, 17.
[9] Wang, F.; Hickner, M.; Kim, Y. S.; Zawodzinski, T. A.; McGrath, J. E. *J. Membrane Sci.* 2002, 197, 231.
[10] Kim, Y. S.; Dong, L.; Hickner, M. A.; McGrath, J. E. *Macromolecules* 2003, 36, 6281.
[11] Harrison, W. L.; Wang, F.; Mecham, J. B.; Bhanu, V. A.; Hill, M.; Kim, Y. S.; McGrath, J. E. *J. Polym. Sci. Part A: Polym. Chem.* 2003, 41, 2264.
[12] Gao, Y.; Robertson, G. P.; Guiver, M. D.; Jian, X. *J. Polym. Sci. Part A: Polym. Chem.* 2003, 41, 497.
[13] Gao, Y.; Robertson, G. P.; Guiver, M. D.; Jian, X.; Mikhailenko, S. D.; Wang, K.; Kaliaguine, S. *J. Polym. Sci. Part A: Polym. Chem.* 2003, 41, 2731.

[14] Gao, Y.; Robertson, G. P.; Guiver, M. D.; Jian, X.; Mil-hailenko, S. D.; Wang, K.; Kaliaguine, S. *J. Membrane Sci.* 2003, 227, 39.
[15] Xiao, G.; Sun, G.; Yan, D.; Zhu, P.; Tao, P. *Polymer* 2002, 43, 5335.
[16] Xiao, G.; Sun, G.; Yan, D. *Macromol Rapid Commun* 2002, 23, 488.
[17] Kerres, J.; Cui, W.; Reichle, P. *J Polym Sci: Part A: Polym Chem Ed* 1996, 34, 2421.
[18] Kerres, J.; Zhang, W.; Cui, W. *J Polym Sci: Part A: Polym Chem Ed* 1998, 36, 1441.
[19] Kerres, J. A. *J. Membrane Sci.* 2001, 185, 3.
[20] Kreuer, K. D. *J. Membrane Sci.* 2001, 185, 29.
[21] Xing, P.; Robertson, G. P.; Guiver, M. D; Mikhailenko, S. D.; Wang, K.; Kaliaguine, S. *J. Membrane Sci.* 2004, 229, 95.
[22] Lafitte, B.; Karlsson, L. E.; Jannasch, P. *Macromol. Rapid Commun.* 2002, 23, 896.
[23] Guiver, M. D.; ApSimon, J. W.; Kutowy, O. *J. Polym. Sci., Polym. Lett. Ed.,* 1988, 26,
[24] Miyatake, K.; Oyaizu, K.; Tsuchida, E.; Hay, A. S.; *Macromolecules* 2001, 34, 2065.
[25] Meng Y. Z.; Tjong, S. C.; Hay, A. S.; Wang, S. J. *J. Polym. Sci. Part A: Polym. Chem.* 2001, 39, 3218.

List of Tables

Table 1 Syntheses of SPAEEKKs
Table 2 Thermal properties of SPAEEKKs
Table 3 Water uptake and swelling ratio of SPAEEKKs
Scheme 1 Synthesis of SPAEEKKs

TABLE 1

Syntheses of SPAEEKKs

| Polymer | DHNS mmol | Second diphenol Mmol | BFBB mmol | $[\eta]^a$ dL/g | Meq g/molSO$_3$ | SC expected | SC from $^1$H-NMR data |
|---|---|---|---|---|---|---|---|
| SPAEEKK-100 | 4 | — | 4 | 2.77 | 575 | 1.0 | 1.00 |
| SPAEEKK-B90 | 4.5 | 0.5 | 5 | 2.64 | 628 | 0.9 | |
| SPAEEKK-B80 | 4 | 1 | 5 | 2.62 | 699 | 0.8 | 0.77 |
| SPAEEKK-B70 | 3.5 | 1.5 | 5 | 1.78 | 788 | 0.7 | |
| SPAEEKK-B60 | 3 | 2 | 5 | 1.01 | 907 | 0.6 | 0.56 |
| SPAEEKK-B50 | 2.5 | 2.5 | 5 | 2.74 | 1058 | 0.5 | |
| SPAEEKK-H90 | 4.5 | 0.5 | 5 | 1.42 | 620 | 0.9 | 0.87 |
| SPAEEKK-H80 | 4 | 1 | 5 | 1.63 | 680 | 0.8 | |
| SPAEEKK-H70 | 3.5 | 1.5 | 5 | 1.34 | 756 | 0.7 | 0.66 |
| SPAEEKK-H60 | 3 | 2 | 5 | 1.19 | 856 | 0.6 | |
| SPAEEKK-H50 | 2.5 | 2.5 | 5 | 1.12 | 997 | 0.5 | 0.48 |

$^a$Measured at 30° C. in DMAc.

TABLE 2

Thermal properties of SPAEEKKs

| | $T_g$ (° C.) | | $T_{d5\%}$ (° C.) | | $T_d$ (° C.) extrapolated onset for first weight loss | |
|---|---|---|---|---|---|---|
| Polymer | Sodium form | Acid form | Sodium form | Acid form | Sodium form | Acid form |
| SPAEEKK-100 | 321 | 223 | 456 | 328 | 440 | 294 |
| SPAEEKK-B90 | 300 | 223 | 465 | 347 | 446 | 307 |
| SPAEEKK-B80 | 291 | 227 | 468 | 347 | 445 | 300 |
| SPAEEKK-B70 | 275 | 214 | 470 | 339 | 449 | 292 |
| SPAEEKK-B60 | 256 | 212 | 474 | 348 | 454 | 292 |
| SPAEEKK-B50 | 236 | 202 | 470 | 339 | 452 | 294 |
| SPAEEKK-H90 | 299 | 230 | 468 | 346 | 458 | 308 |
| SPAEEKK-H80 | 289 | 218 | 469 | 345 | 448 | 305 |
| SPAEEKK-H70 | 269 | 208 | 472 | 342 | 455 | 297 |
| SPAEEKK-H60 | 253 | 200 | 476 | 341 | 466 | 300 |
| SPAEEKK-H50 | 215 | 180 | 489 | 353 | 483 | 306 |

TABLE 3

Water uptake and swelling ratio of SPAEEKKs

| | Room temperature | | | | 80° C. | | | |
|---|---|---|---|---|---|---|---|---|
| | Water uptake (%) | | Swelling ratio (%) | | Water uptake (%) | | Swelling ratio (%) | |
| Polymer | Sodium form | Acid form | Sodium form | Acid form | Sodium form | Acid form | Sodium form | Acid form |
| SPAEEKK-100 | 22.3 | 41.5 | 8.93 | 16.7 | 958 | S | 116 | S |
| SPAEEKK-B90 | 16.0 | 32.8 | 8.16 | 11.2 | 38.6 | 87 | 17.9 | 46.5 |

TABLE 3-continued

Water uptake and swelling ratio of SPAEEKKs

| | Room temperature | | | | 80° C. | | | |
|---|---|---|---|---|---|---|---|---|
| | Water uptake (%) | | Swelling ratio (%) | | Water uptake (%) | | Swelling ratio (%) | |
| Polymer | Sodium form | Acid form | Sodium form | Acid form | Sodium form | Acid form | Sodium form | Acid form |
| SPAEEKK-B80 | 12.7 | 26.4 | 7.34 | 10.1 | 31.2 | 43.4 | 12.2 | 17.7 |
| SPAEEKK-B70 | 11.5 | 24.2 | 6.50 | 8.89 | 23.2 | 28.3 | 9.26 | 11.6 |
| SPAEEKK-B60 | 9.23 | 18.3 | 4.36 | 6.48 | 17.2 | 21.2 | 6.03 | 8.16 |
| SPAEEKK-B50 | 9.00 | 12.4 | 3.85 | 4.42 | 15.1 | 14.3 | 5.10 | 5.97 |
| SPAEEKK-H90 | 21.3 | 44.4 | 8.80 | 12.5 | 50.7 | 62.6 | 23.3 | 25.1 |
| SPAEEKK-H80 | 19.5 | 25.5 | 7.28 | 9.68 | 47.1 | 57.2 | 15.2 | 21.9 |
| SPAEEKK-H70 | 15.0 | 20.5 | 6.33 | 9.60 | 24.7 | 33.4 | 11.0 | 15.3 |
| SPAEEKK-H60 | 13.6 | 14.2 | 4.00 | 7.87 | 20.8 | 30.0 | 11.0 | 12.8 |
| SPAEEKK-H50 | 11.3 | 13.6 | 2.62 | 4.97 | 17.0 | 21.9 | 7.91 | 8.76 |

S denotes partially soluble

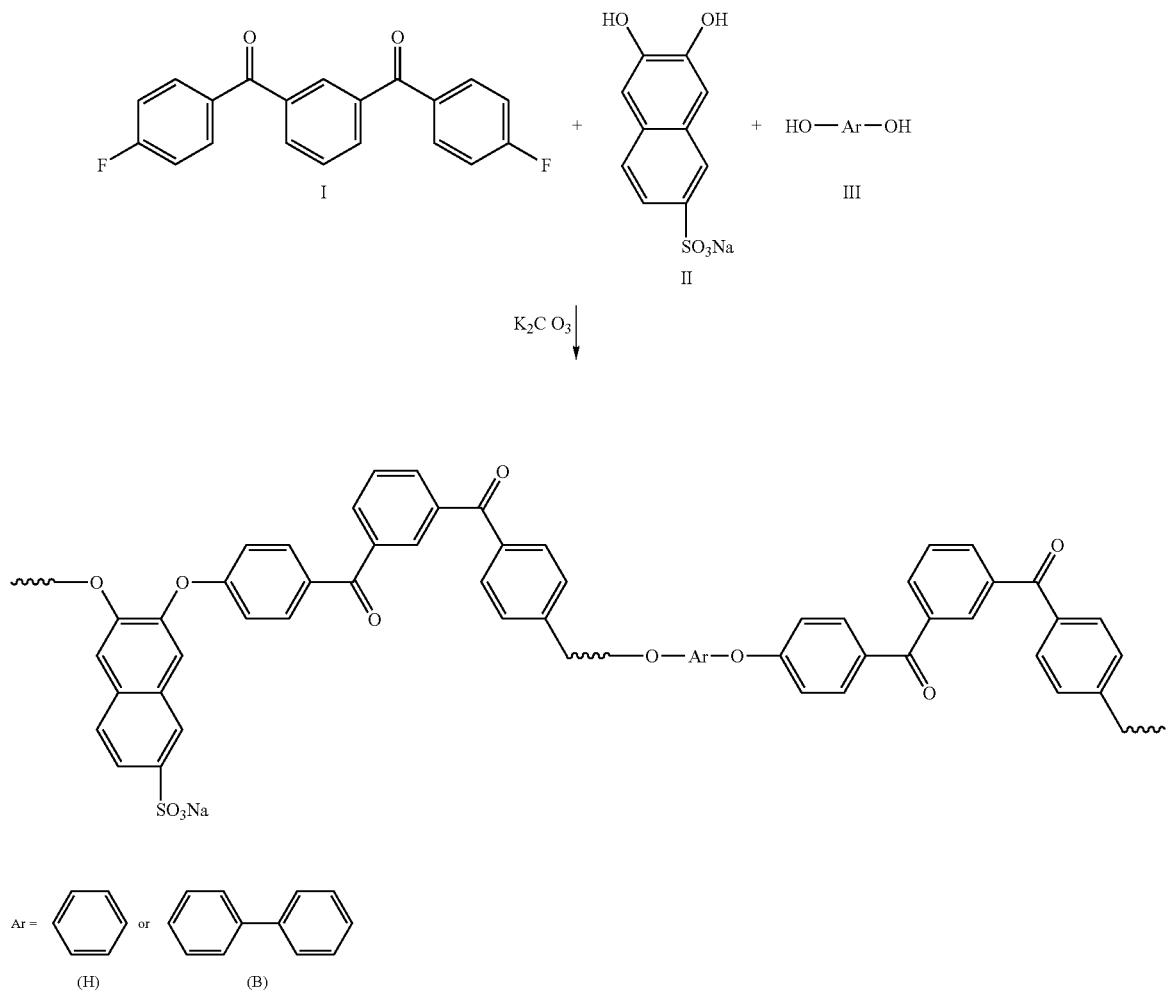

Scheme 1 Synthesis of SPAEEKKs

What is claimed is:

1. A poly(arylene ether ether ketone ketone) copolymer containing sulfonic acid groups (SPAEEKK) of structural formula I, consisting of

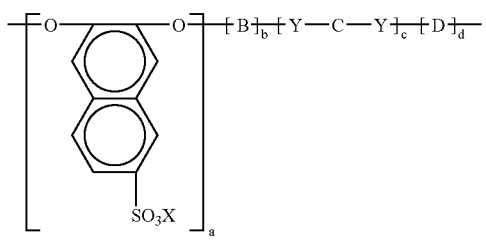

wherein X is H or a cation,
Y is sulfur or oxygen,
B and D are

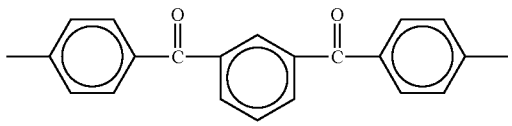

C is derived from either a bisphenol or bisthiol and is used to control the sulfonate content in the copolymer and is selected from:

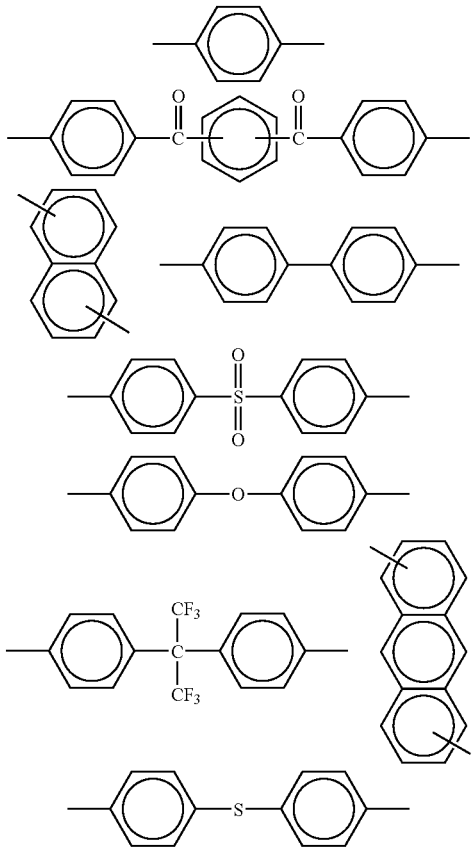

-continued

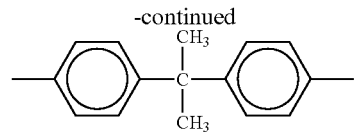

wherein a,b,c,d represent mol fractions of the monomer present in the copolymer where each are independently from 0.1 to 1, and (a+c)=(b+d).

2. A co-polymer according to claim 1, wherein X is H or an alkali metal counterion selected from the group consisting of $Li^+$, $Na^+$, $K^+$, $Rb^+$ or $Cs^+$, or an ammonium salt, 3. A co-polymer according to claim 2, wherein C is selected from the group consisting of biphenyl, naphthyl, and hexafluoro-isopropylidene-biphenyl.

4. A co-polymer according to claim 3, wherein X is $Na^+$.

5. A co-polymer according to claim 4, wherein C is biphenyl.

6. A co-polymer according to claim 1 wherein the sulfur content (SC) of the co-polymer is 0.5 to 1.0.

7. A co-polymer according to claim 1, in the form of a membrane.

8. A process for making a co-polymer of structural formula I as defined in claim 1 comprising reacting at elevated temperature in the presence of $K_2CO_3$, a compound resulting from polycondensation in the residue of a monomer

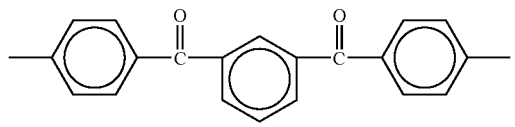

a sulfonated naphthalene diphenol monomer of structural formula II

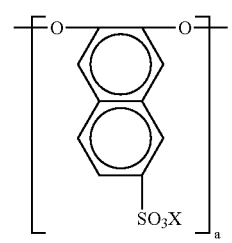

wherein X is H or an alkali metal counterion selected from the group consisting of $Li^+$, $Na^+$, $K^+$, $Rb^+$ or $Cs^+$, or an ammonium salt, and a compound resulting from polycondensation in the residue of a monomer of structural formula III

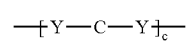

wherein Y is sulfur or oxygen, and
C is derived from either a bisphenol or bisthiol and is used to control the sulfonate content in the copolymer and is selected from:

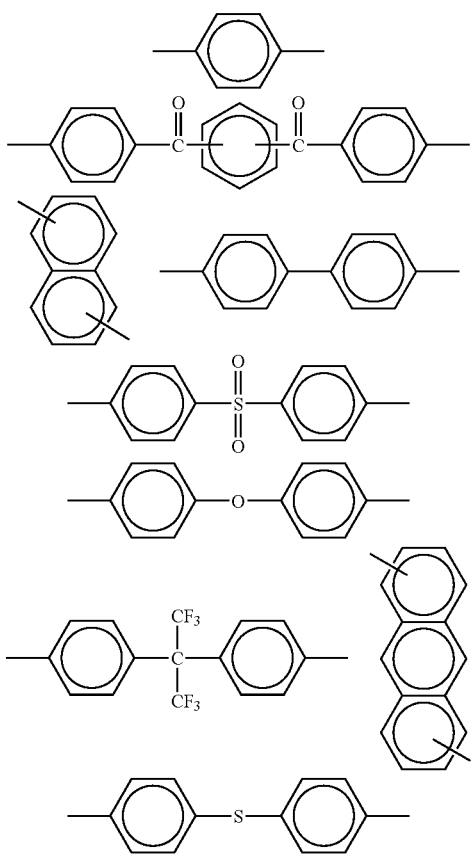

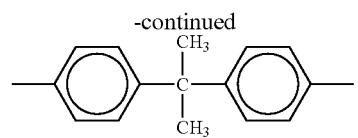

wherein a,b,c,d represent mol fractions of the monomer present in the copolymer where each are independently from 0.1 to 1, and (a+c)=(b+d).

9. A process according to claim 8, wherein the reaction is effected under inert gas atmosphere.

10. A process according to claim 9, wherein an aprotic polar solvent and a drying agent are also present.

11. A process according to claim 10, wherein the organic solvent is NMP, DMAc, DMF, or DMSO and the drying agent is toluene or xylene.

12. A process according to claim 11, wherein C is selected from the group consisting of biphenyl, naphthyl, and hexafluoro-isopropylidene-bisphenyl.

13. A process according to claim 12, wherein the reaction is effected in a heating step to 130-140° C. to de-hyd rate, and then increasing the temperature to 160-170° C. to complete the reaction.

14. A process according to claim 8, wherein the sulfur content (SC) of the co-polymer is 0.5 to 1.0.

15. A process according to claim 14, wherein X is Na.

16. A process according to claim 15, wherein C is biphenyl.

17. A process according to claim 8, including the additional step of casting the co-polymer in the form of a membrane.

* * * * *